United States Patent
Sone et al.

(10) Patent No.: US 8,104,977 B2
(45) Date of Patent: Jan. 31, 2012

(54) PLUGGABLE TRANSCEIVER WITH BI-DIRECTIONAL OPTICAL SUB-ASSEMBLY

(75) Inventors: Hidemi Sone, Yokohama (JP); Yuuichi Kitajima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 455 days.

(21) Appl. No.: 12/431,189

(22) Filed: Apr. 28, 2009

(65) Prior Publication Data

US 2009/0269077 A1 Oct. 29, 2009

Related U.S. Application Data

(60) Provisional application No. 61/071,420, filed on Apr. 28, 2008.

(30) Foreign Application Priority Data

Jun. 25, 2008 (JP) ................. P2008-166166
Jun. 25, 2008 (JP) ................. P2008-166234
Jun. 25, 2008 (JP) ................. P2008-166392

(51) Int. Cl.
*G02B 6/36* (2006.01)

(52) U.S. Cl. .............................. 385/92; 385/88; 385/139

(58) Field of Classification Search .................. None
See application file for complete search history.

(56) References Cited

U.S. PATENT DOCUMENTS

| | | | |
|---|---|---|---|
| 7,125,261 B2 * | 10/2006 | Yoshikawa et al. | 439/76.1 |
| 7,309,172 B2 | 12/2007 | Okada | |
| 7,367,718 B2 | 5/2008 | Oki et al. | |
| 7,406,230 B2 | 7/2008 | Yoshikawa | |
| 7,416,353 B2 | 8/2008 | Yoshikawa et al. | |
| 2005/0286838 A1 * | 12/2005 | Oki et al. | 385/92 |
| 2006/0039657 A1 | 2/2006 | Okada et al. | |
| 2007/0230878 A1 * | 10/2007 | Nakazawa et al. | 385/92 |
| 2008/0031574 A1 * | 2/2008 | Tanaka | 385/88 |

* cited by examiner

*Primary Examiner* — Michelle R Connelly Cushwa
(74) *Attorney, Agent, or Firm* — Venable LLP; Michael A. Sartori; Leigh D. Thelen

(57) ABSTRACT

An optical transceiver is disclosed, in which the transceiver installs a BOSA and has an additional heat conducting path from the BOSA to the cover and to the base independent of the path from the IC to the cover. The optical transceiver includes a heat conductor that comes in thermally contact with the BOSA, the cover and the base. The heat conductor, which is made of metal sheet, has a ceiling piece that comes in contact with the cover and a pair of legs with the bottom surface that comes in contact with the base in both sides of the BOSA.

7 Claims, 16 Drawing Sheets

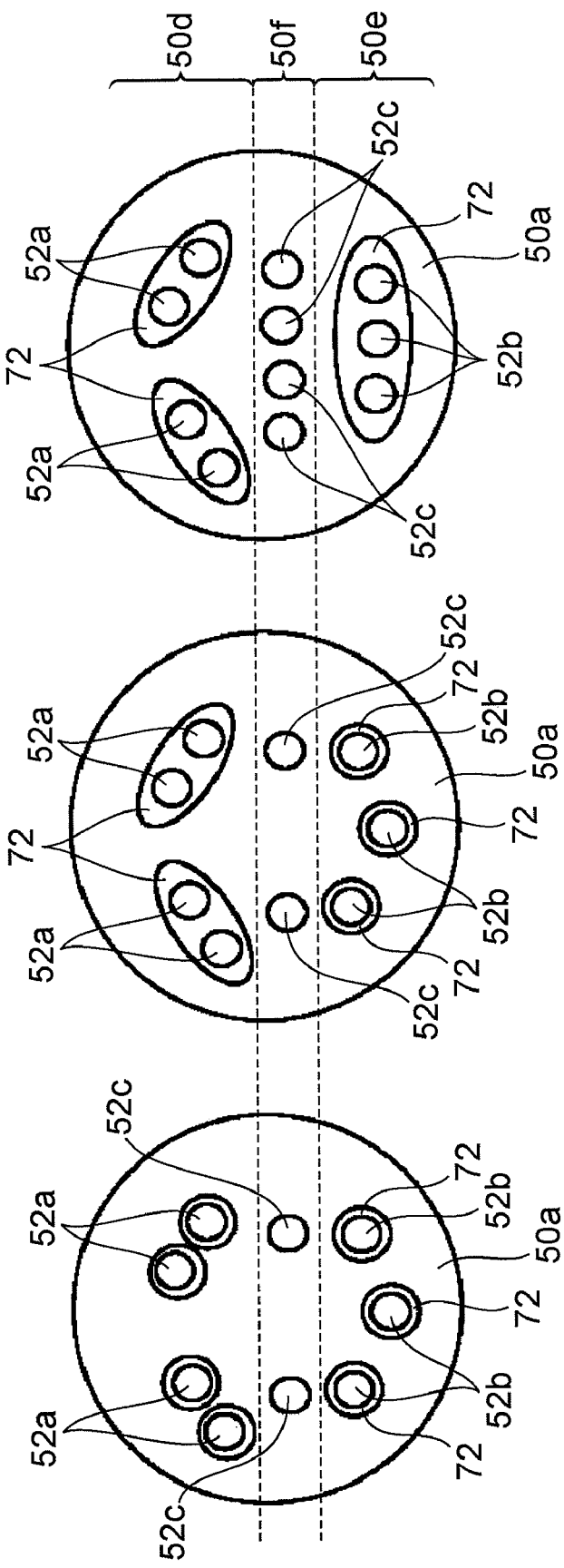

PLUGGABLE TRANSCEIVER WITH BI-DIRECTIONAL OPTICAL SUB-ASSEMBLY

CROSS REFERENCE TO RELATED APPLICATION

This application claims the benefit of the U.S. provisional patent application 61/071,420, filed on Apr. 28, 2008, the disclosure of which is incorporated herein by reference. The contents of the present application closely relates to an United States Patent, U.S. Pat. No. 7,406,230, titled "Optical transceiver with a pluggable function", and to an United States Patent, U.S. Pat. No. 7,367,718, titled "Optical module", which are incorporated herein by reference in their entirety.

BACKGROUND OF THE INVENTION

1. Field of the Invention

The present invention relates to an optical transceiver with a pluggable function, in particular, the invention relates to the optical transceiver installing a bi-directional optical sub-assembly with a single package.

2. Related Background Art

A bi-directional optical sub-assembly (hereinafter denoted as BOSA) has been developed and is now installed in the optical transceiver. Such a BOSA enables to transmit an optical signal to an optical fiber and to receive another optical signal from the optical fiber concurrently by differentiating the wavelengths to each other. The United States Patent published as US-20060039657A has disclosed one type of BOSAs, in which the optical transceiver installs a transmitter optical device and a receiver optical device having individual packages are assembled in a transceiver body where a wavelength division multiplexing filter (WDM filter) is provided. This type of the BOSA is called as the multi-packaged BOSA. While, the United States Patent, U.S. Pat. No. 7,309,172, has disclosed another type of the BOSA which installs the light-emitting device, the light-receiving device and the WDM filter within a single package, which is called as the single-packaged BOSA.

Because the single-packaged BOSA encloses both the light-emitting device and the light-receiving device immediately close to each other, it should be taken the crosstalk between the transmitter unit and the receiver unit, especially, the crosstalk from the transmitter unit to the receiver unit into account. Further, because the single packaged BOSA installs many devices in the single package compared to the multi-packaged BOSA, which increases the heat generated by the devices, the thermal stability of the BOSA should be also considered.

The present invention is to provide an optical transceiver with the single-packaged BOSA that improves both the noise characteristic including the crosstalk performance and the heat dissipation.

SUMMARY OF THE INVENTION

The optical transceiver according to the present invention, which is installed on and communicated with a host system by being inserted in a cage prepared in the host system, comprises a BOSA, a printed circuit board (PCB), a base, a sub-base, and a cover. The base, the sub-base, and the cover are made of metal sheet by cutting, bending and fitting each other without any adhesive or soldering. The BOSA has a single package that installs both a light-emitting device such as laser diode and a light-receiving device such as photo-diode. The PCB mounts an IC that is electrically connected with the BOSA. The base mounts the BOSA and the PCB thereof. The sub-base sandwiches the PCB with the base. Thus, the sub-base is in thermally contact with the IC on the PCB. The cover, which encloses the BOSA, the PCB, the base and the sub-base therein, comes in thermally contact with said cage at a rear end thereof.

The optical transceiver of the present invention has a feature that the transceiver further includes a heat conductor, which is also made of metal sheet and is formed by cutting and bending without any welding nor adhesive. The heat conductor comes in thermally contact with the BOSA, the base and the cover to secure a heat conducting path from the BOSA to the base and to the cover independent of the path from the IC to the cage through the sub-base. Because the heat generated in the BOSA may be conducted to the cover and to the base independent of the sub-base, not only the heat may be dissipated outwardly even when the BOSA installs two devices therein but also the BOSA may be escaped from the heat generated by the IC on the PCB.

These and other exemplary embodiments, features, aspects, and advantages of the present invention will be described and become apparent from the following detailed description of exemplary embodiments, which is to be read in connection with the accompanying drawings.

BRIEF DESCRIPTION OF THE DRAWINGS

FIG. 6A is viewed from the front, while, FIG. 6B is viewed from the rear;

FIGS. 9A and 9B are perspective views of the base, in which FIG. 9A is viewed from the front and FIG. 9B is viewed from the rear;

FIGS. 12A to 12C show various arrangements of the lead pins of the optical device;

DESCRIPTION OF THE PREFERRED EMBODIMENTS

Next, preferred embodiments of the present invention will be described in detail. In the description of the drawings, the same elements will be described by the same symbols or the same numerals without overlapping explanations.

Figure 1:
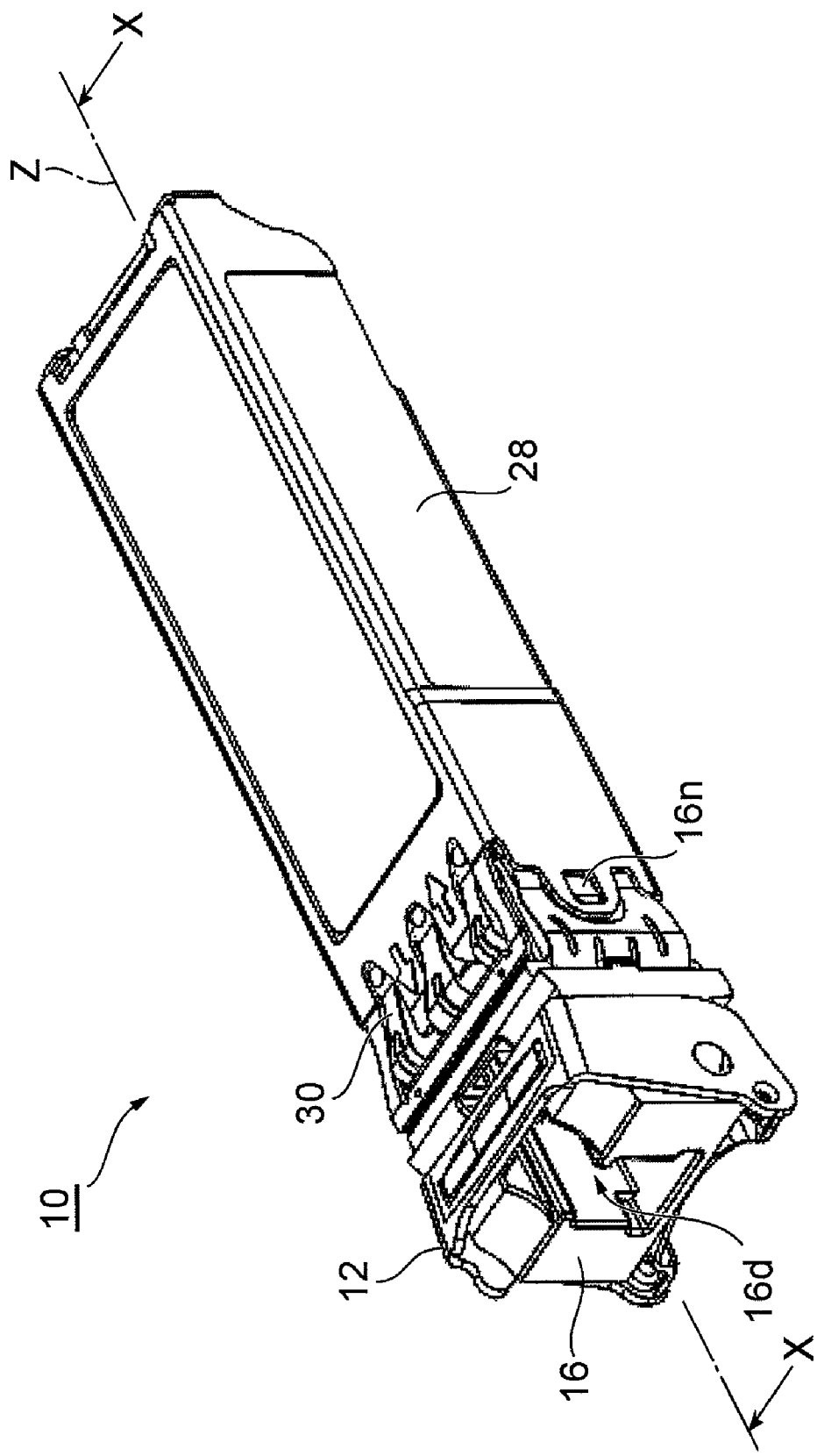
FIG. 1 is a perspective view of the optical transceiver with the pluggable function, which is according to an embodiment of the present invention.
Figure 2:
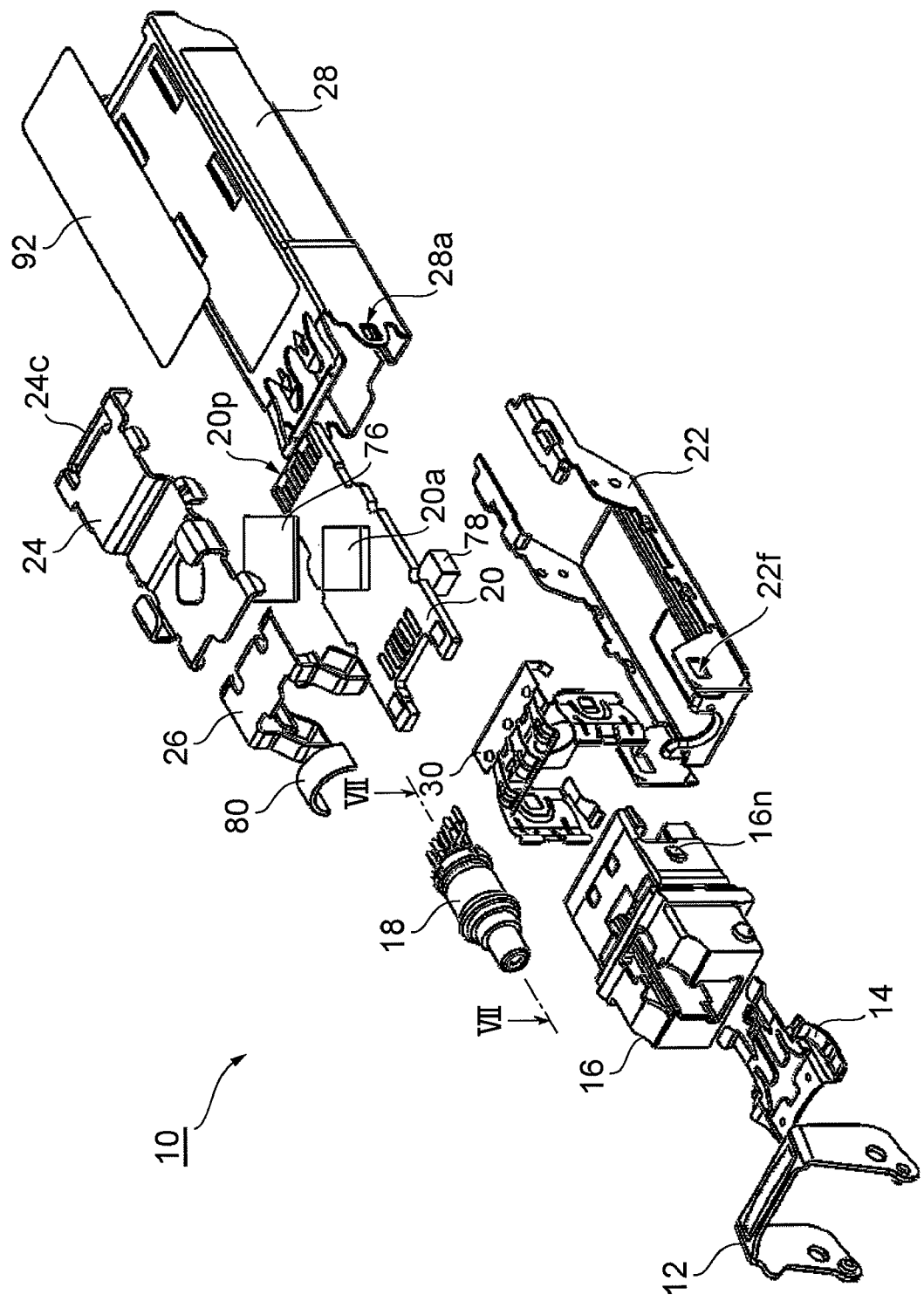
FIG. 2 is an exploded view of the optical transceiver illustrated in FIG. 1.

FIG. 1 is an external appearance of an optical transceiver 10 according to the present invention, while, FIG. 2 is an exploded view of the optical transceiver 10. The outer dimensions and fundamental electronics specifications of this transceiver 10 follow an agreement relating to the small form-factor pluggable (SFP) standard. This type of the SFP transceiver is used to be set within the cage prepared in the host system, and provides, in a front side of the longitudinal axis Z that substantially aligned with the optical axis of the optical subassembly 18, an optical receptacle 16 to receive an optical connector with an optical fiber in an end portion thereof, while, it provides an electrical connector plug 20p to communicate with the host system in a rear side of the axis Z. In the description below, the front side corresponds to a side where the optical receptacle 16 is formed, while, the rear side corresponds to the other side where the electrical connector plug is prepared.

The metal cover 28 encloses the whole components of the transceiver 10. This pluggable transceiver 10 is inserted within the cage from the rear side to be engaged with an electrical connector provided in the deep end of the cage, which establishes the electrical communication between the transceiver 10 and the host system. The engagement between the transceiver 10 and the host system, in other word, the insertion of the transceiver 10 into the cage may be carried out without turning off the electrical power of the host system; accordingly, such an optical transceiver 10 is often called as the "pluggable optical transceiver".

The optical receptacle 16 receives, as described above, the optical connector with the singlet configuration. The optical transceiver 10 provides the bail 12 that makes a pivot motion so as to traverse the front of the optical receptacle 16. The bail 12, by the pivot motion thereof, operates the actuator 14 so as to disengage the head of the actuator 14 with the cage to release the optical transceiver 10 from the host system.

A plurality of finger members 30 is externally protruded in a rear side of the optical receptacle 16. Setting the optical transceiver 10 within the cage, these finger members 30 come in contact with the inner wall of the cage to ground the housing 28 to the ground of the host system. This may suppress the noise generated in the optical transceiver 10 from leaking out therefrom, and may also suppress the noise from invading in the transceiver 10.

Moreover, as described below, the arrangement between the optical transceiver 10 and the cage may realize that the housing 28 is grounded in the chassis ground, which is isolated from the signal ground within the optical transceiver 10, and the transmitter unit and the receiver unit are grounded to the chassis ground and the signal ground, independently, which effectively improves the crosstalk between the transmitter unit and the receiver unit.

FIG. 2 is an exploded view of the transceiver shown in FIG. 1. The transceiver 10 roughly comprises of the bail 12, the actuator 14, the optical receptacle 16, the optical module 18, the printed circuit board (hereafter denoted as PCB) 20, the base 22, the sub-base 24, the heat conductor 26, the metal cover 28, and the finger member 30. The bail 12 and the actuator 14 are assembled with the optical receptacle 16. Although FIG. 2 shows the bail 12 and the actuator 14 made of metal, these members may be made of resin as disclosed in the U.S. Pat. No. 7,406,230.

The optical receptacle 16, which is made of resin, determines a space where the optical fiber in the external optical connector optically couples with the optical module 18 by receiving the optical connector in the front side, while, it receives the optical module 18 in the rear side. The optical receptacle 16 provides a rear wall with a circular opening into which a coupling portion of the optical module 18 is inserted. This arrangement may precisely define the positional relation between the optical module 18 and the optical receptacle 16 within a plane perpendicular to the longitudinal axis of the transceiver 10.

The position of the optical module 18 along the longitudinal axis Z may be determined as follows: the base 22, which installs the optical module 18 assembled with the optical receptacle 16, is engaged with the optical receptacle 16; then, the base 22 presses the optical module 18 against the optical receptacle 16. Moreover, the cover 28, which is also assembled with the optical receptacle 16, rigidly fixes the base 22 to the optical receptacle 16 to determine the position of the optical module 18 with respect to the optical receptacle 16.

The base 22, which is made of metal formed by cutting, bending and pressing a metal sheet without any welding, supports the optical module 18. The base 22 provides, in the front wall thereof, a U-shaped cutting into which the optical module 18 is set. Moreover, as described below, the front wall of the base 22 presses the optical module 18 against the rear wall of the optical receptacle 16, which rigidly fixes the optical module 18 to the optical receptacle 16. The base 22 also supports the PCB 20.

The sub-base 24 fixes the PCB 20 by engaging with the base 22 as sandwiching the PCB 20 with the base 22. The sub-base 24, which is also formed by cutting, bending and pressing without any welding a metal sheet thicker than the metal sheet of the base 22, conducts heat generated by the ICs mounted on the PCB 20. The sub-base 24 is in contact with the ICs in the flat portion thereof, while, a rear end portion thereof exposes from the cover 28, which enables the rear end of the sub-base 24 to come in contact with the deep end of the cage when the transceiver 10 is set in the cage. Thus, the sub-base 24 secures a heat conducting path from the IC on the PCB 20 to the cage in the host system.

In electronic equipments, the power consumption of devices installed in the equipments becomes quite large as the operating speed and the integration density increase. The heat conducting mechanism; or, the heat dissipating design becomes more and more important. Conventional equipments provide, for instance, a plurality of heat-dissipating fins in an outer surface to enhance the heat radiating performance. However, the pluggable transceiver such as those of the present invention has a primitive function to be inserted into or extracted from the cage on the host system; accordingly, it is impossible to provide such thermal fins in the outer surface of the housing because they would bring problems in the insertion or the extraction of the transceiver. The rear end of the pluggable transceiver is the only spot possibly coming in contact with the cage without obstructing the motion of the transceiver within the cage. Accordingly, the present transceiver provides the sub-base 24 to conduct heat effectively from the IC on the PCB 20 to the rear end of the transceiver 10.

The optical module 18 also generates heat by the semiconductor elements installed therein, such as a semiconductor laser diode and a pre-amplifier. The heat generated by such semiconductor elements may be conducted to the rear end of the transceiver 10 by securing the conducting path, independent of the sub-base 24 described above, from the optical module 18 through the heat conductor 26 that comes in thermally contact with the optical module 18 and the cover 28. This heat conductor 26 is not in contact with the sub-base 24 to release the optical module 18 from the heat generated by the ICs. Moreover, the optical transceiver 10 of the present invention provides, in the front side thereof, the finger member 30 that comes in contact with the cage in addition to the rear end of the sub-base 24. The heat conducted to the heat conductor 26 may be dissipated to the cage through the cover 28 and through the finger member 30.

The cover 28 secures a space extending along the longitudinal axis Z. The cover 28 is assembled with the optical receptacle 16 from the rear side so as to enclose the base 22, the sub-base 24, the heat conductor 26 and the PCB 20 in the space, and to engage the opening formed in the front thereof with the projection in the sides of the optical receptacle 16. Thus, the assembly of the present transceiver 10 may be carried out by engaging and fitting the members without any screws, adhesive and welding, which may make the assembling process simple and may reduce the cost. Next, respective members in the transceiver 10 will be described in detail.

(Bi-directional Optical Module/Assembly; BOSA)

Figure 3:
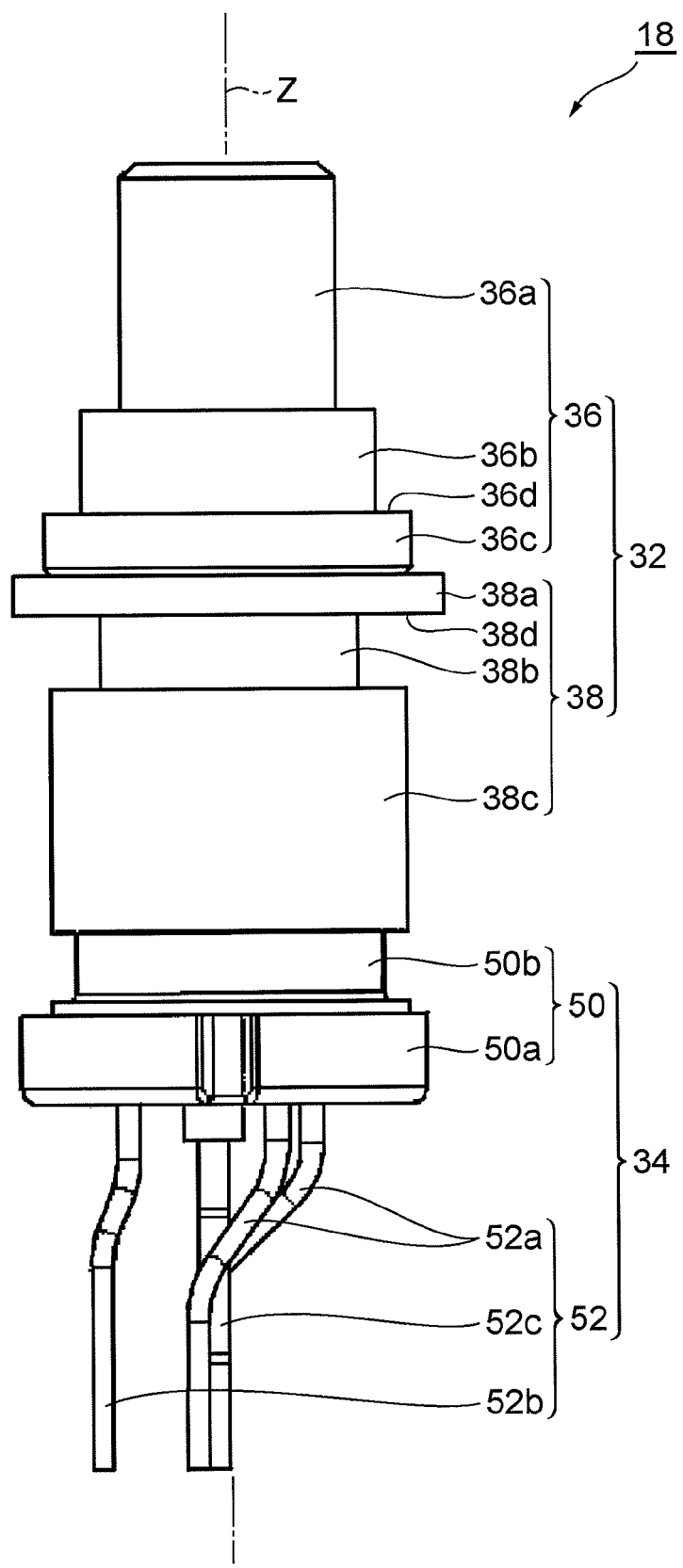
FIG. 3 is a side view of the optical module according to an embodiment of the invention, where the optical module is installed in the optical transceiver shown in FIGS. 1 and 2.
Figure 4:
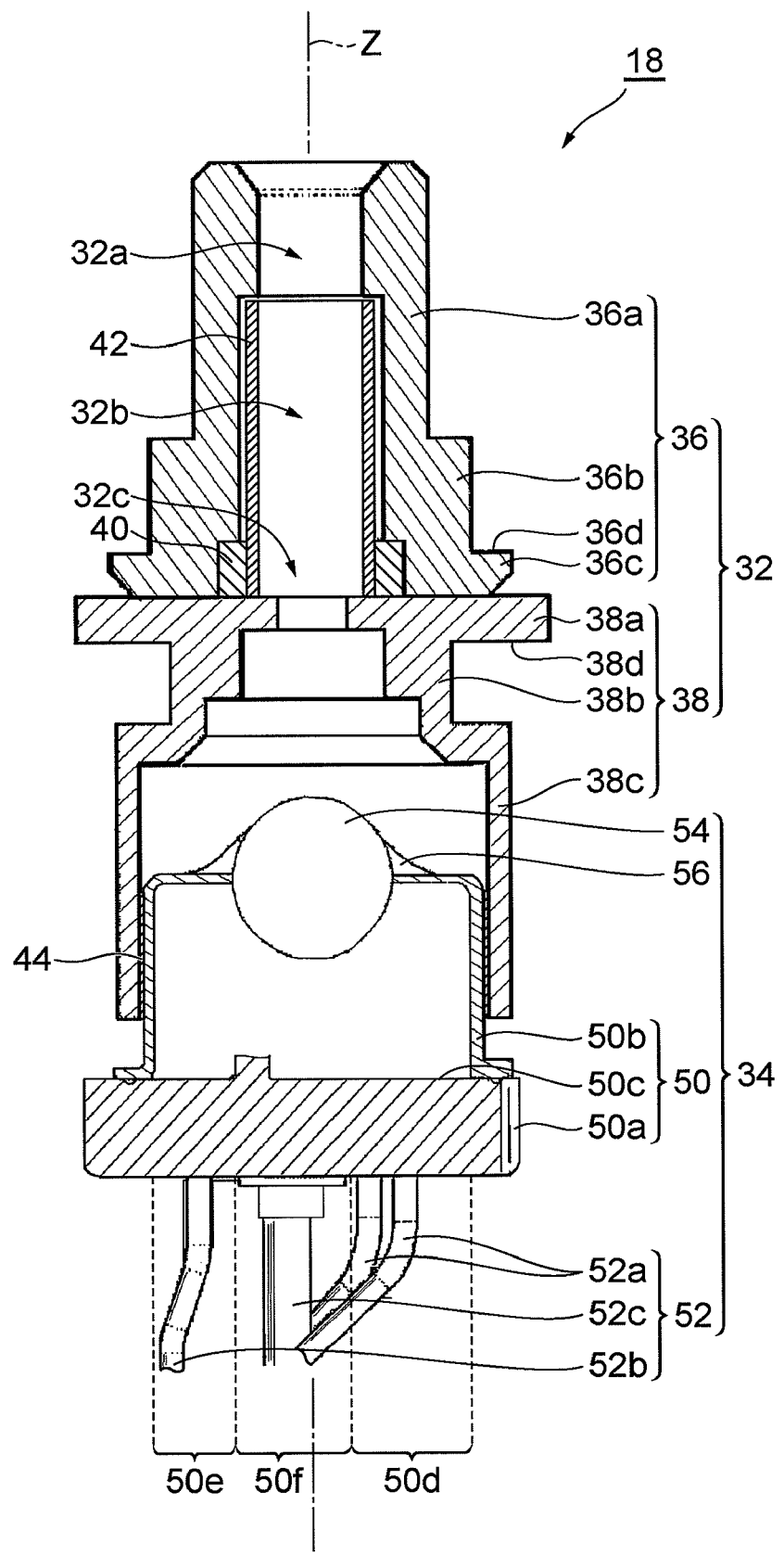
FIG. 4 is a vertical cross section of the optical module shown in FIG. 3.

FIG. 3 is a side view of the optical module 18 according to an embodiment of the present invention, while, FIG. 4 is a vertical cross section thereof taken along the longitudinal axis Z. The optical module 18 is a type of the bi-directional module with one package and is able to communicate with the single fiber, thus, the optical module 18 is often called as the bi-directional optical sub-assembly (BOSA). The optical module 18 comprises a coupling portion 32, which includes a first sleeve 36 and a second sleeve 38, and an optical device 34. The second sleeve 38 connects and aligns the optical device 34 with the first sleeve 36, thus, the second sleeve 38 is often called as the joint sleeve (hereafter denoted as J-sleeve). The first sleeve 36 and the J-sleeve 38 are made of metal, but they may be made of resin or plastics.

The first sleeve 36, as illustrated in FIG. 4, provides bores, 32a to 32c, each having a common axis identical with the longitudinal axis Z and diameters gradually increasing along with the axis. The center bore 32b and the last bore 32c receives the sleeve 42, while, the last bore 32c receives the bush 40. That is, the bush 40 is press-fitted between the shell and the sleeve 40. The sleeve 42 may be a split sleeve or a rigid sleeve. This sleeve 42 receives a ferrule provided in an end of an optical connector to couple the optical device 34 with an optical fiber secured in a center of the ferrule. Here, the outer diameter of the sleeve 42 is larger than the diameter of the top bore 32a, while, an inner diameter of the sleeve 42 is smaller than the diameter of the top bore 32a.

The first sleeve 36, which has a cylindrical shape, provides a front portion 36a, a rear portion 36b, and a flange 36c. The flange 36c has the largest diameter. The J-sleeve 38, which also has a cylindrical shape, provides a flange 38a, a necked portion 38b, and a skirt portion 38c. The flange 36c of the first sleeve 36 and the flange 38a of the J-sleeve 38 constitute an integrated flange of the coupling portion 32. The integrated flange provides a front surface 36d of the flange 36c and a rear surface 38d of the flange 38a. On the other hand, the flange 36c of the first sleeve 36 provides a rear surface; while, the flange 38a of the J-sleeve 38 provides the front surface. By sliding the first sleeve 36 on the J-sleeve 38 as the rear surface of the flange 36c faces and comes in contact with the front surface of the flange 38a, the optical alignment between the fiber in the optical connector and the semiconductor optical device installed in the optical device 34 can be performed.

The necked portion 38b, as described in later, is set within the U-shaped cut in the base 22, which presses the rear surface 38d of the flange 38a forward. Thus, the front surface 36d of the flange 36c is abutted against the rear wall 16g of the receptacle 16. Sandwiched between the front surface 36d and the rear wall 16g is the finger member 30.

The skirt portion 38c receives the cap 50b of the optical device 34. An insertion depth of the cap 50b into the bore of the skirt portion 38c may align the optical device 34 with the coupling portion 32 along the optical axis Z. The adhesive 44 fills a gap between the skirt portion 38c and the cap 50b to fix the cap 50b to the J-sleeve 38. This adhesive has a function to electrically isolate the J-sleeve 38 from the cap 50b. As explained later, when the optical module 18 is assembled with the optical receptacle 16, the J-sleeve 38 is grounded to the chassis ground, while, the cap 50b assembled to the optical device 34 is connected to the signal ground. It should avoid for the signal ground to be identical with the chassis ground from viewpoints of the crosstalk between the transmitter unit and the receiver unit, or another viewpoint of the electromagnetic interference (EMI). Therefore, the J-sleeve 38 is electrically isolated from the cap 50b by filling the adhesive between the skirt portion 38c and the cap 50b. The resin made J-sleeve may show the same function.

Figure 5:
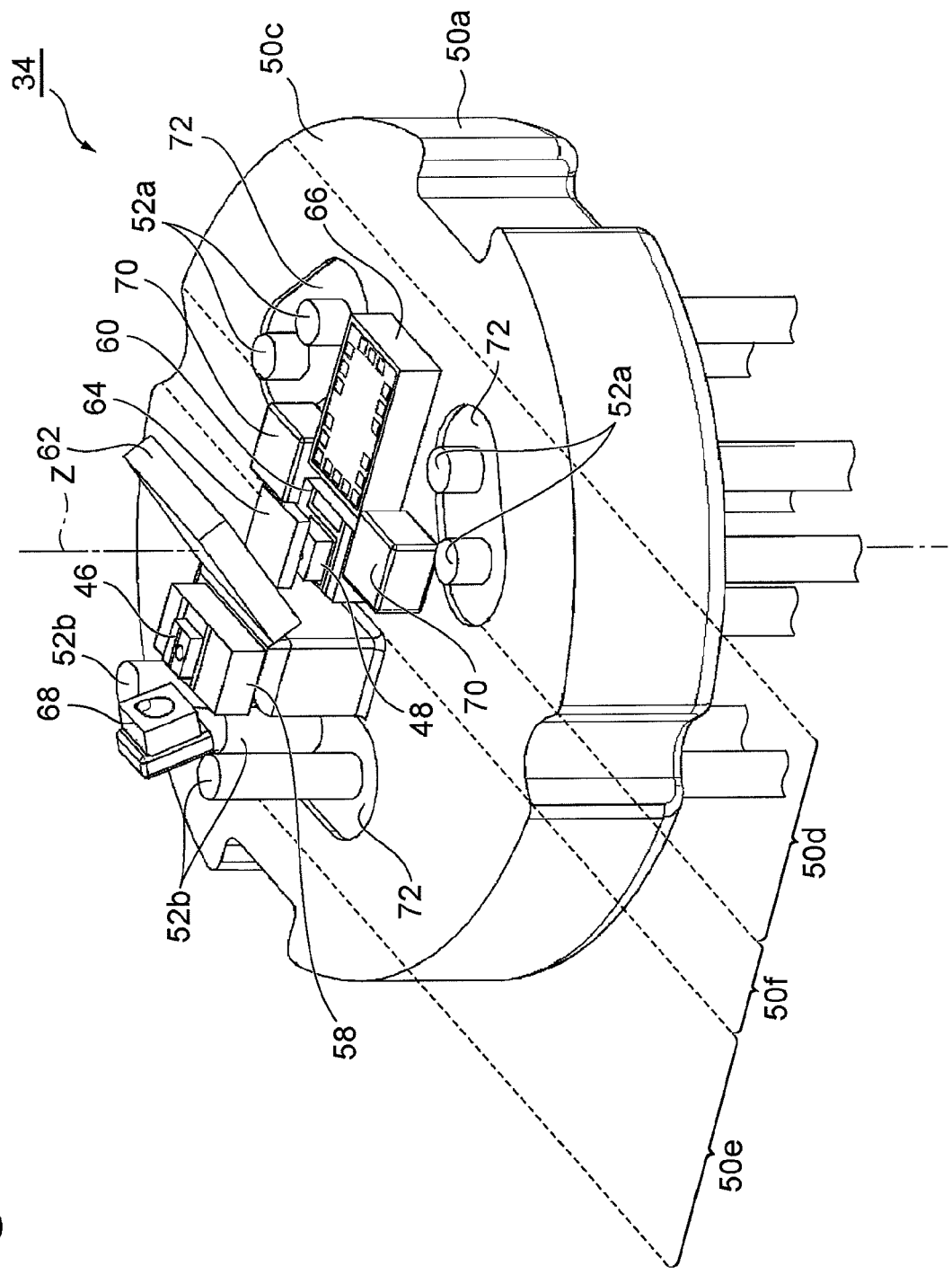
FIG. 5 shows an inside of the optical device shown in FIGS. 3 and 4, in which the cap is removed to show the inside thereof.

FIG. 5 illustrates an arrangement of members within the optical device 34, where the cap 50b is eliminated to show the inside. As illustrated in FIGS. 3 to 5, the optical device 34 installs, on a primary surface 50c thereof, a semiconductor laser diode (hereafter denoted as LD) 46 as a light-emitting device, a semiconductor photodiode (hereafter denoted as PD) 48 as a light-receiving device, a WDM filter 62 to discriminate the receiving light from the transmitting light, a wavelength cut filter 64 and a pre-amplifier 66 to amplify an electronic signal output from the PD 48. FIG. 5 removes structures to secure the WDM filter 62. The primary surface 50c further mounts a monitor PD (hereafter denoted as MPD) 68 and a plurality of die-capacitors 70.

The package 50, which may be made of metal and encloses the LD 46 and the PD 48, includes the stem 50a and the cap 50b. The cap 50b, which is made of metal and has a cylindrical shape extending along the axis Z, has a lens 54 in one end thereof fixed with a seal glass 56. The other end of the 50b is fixed to the stem 50a by, for instance, the resistance welding. The disk-shaped stem 50a has the primary surface 50c whose normal extends along the axis Z. This primary surface mounts the LD 46 through the LD sub-mount 58 and the PD through the PD sub-mount 60.

As already mentioned, the optical device 34 is the type of the bi-directional module with the LD 46 and the PD 48 both installed within the single package. Specifically, the light emitted from the LD 46 is reflected by the by the WDM filter 62, heads upward, is concentrated with the lens 54 set in the ceiling of the cap 50b, and finally couples with the optical fiber inserted in the coupling portion 32. While, the light provided from the optical fiber is concentrated with the lens 54, transmits through the WDM filter 62 and the cut filter 64, and finally enters the PD 48. Thus, the WDM filter 62 is necessary to reflect the light from the LD 46 with a wavelength of 1.31 μm and to transmit the other light provided from the optical fiber with a wavelength of 1.48 μm. The WDM filter 62 illustrated in FIG. 5 has a type of a multi-layered dielectric film formed on a substrate transparent for the light with the wavelength of 1.48 μm. The reflection and transmission spectra of this type of the WDM filter 62 may be adjustable by varying thicknesses and refractive indices of respective dielectric films.

When two units are installed within the same package as those of the present invention, the crosstalk between two units becomes significantly important. In particular, the LD 46 generates the modulated optical signal by being provided with a large modulation current, a range of which reaches several tens of milli-ampere. On the other hand, the PD 48 receives a faint optical signal with a magnitude thereof ranging from several hundreds micro-decibel (dBμ) to several milli-decibel (dBm), which is no more than several milli-volts (mV) even after converting it into an electrical signal. When a large current is switched at a place close to a circuit processing such a faint signal, the EMI noise, due to the current switching itself or the instability of the ground potential due to the large current flowing into the ground, affects the receiving unit.

Accordingly, the optical device 34 of the present module eliminates the crosstalk noise mentioned above by effectively isolating the receiving unit from the transmitting unit on the primary surface 50$c$ and by providing the signal ground between them. Specifically, the stem 50$a$ provides first to third regions, 50$d$ to 50$f$, on the primary surface 50$c$. The third region 50$f$ is put between the other regions, 50$d$ and 50$e$, to divide them. Lead pins 52 may be divided into three groups, 52$a$ to 52$c$, depending on the function attributed thereto, each of which is located in the corresponding regions, 50$d$ to 50$f$. The first and second groups of the lead pins, 52$a$ and 52$b$, are secured to the stem 50$a$ through the seal glass 72 to isolate them from the stem 50$a$, while, the third group of the lead pin 52$c$ is directly connected with the stem 50$a$.

The receiving unit provides a pair of outputs complementary to each other from the pre-amplifier 66. These outputs are divided to each lead pin 52$a$ arranged in both sides of the pre-amplifier 66 in the first region 50$d$. While, the switching current is supplied from the lead pin 52$c$ arranged in the opposite side of the first group of the lead pin 52$a$ with respect to the third group of the lead pin 52$c$. In the present embodiment, four lead pins 52$a$ in the first group may be assigned such that two pins are for the output signals, one is for the bias supply Vpd for the PD 48, and the rest is for the power supply Vcc of the preamplifier 66. One of signal lead pins and one of the power supply pins are collectively sealed in one side of the preamplifier 66, while, the rest of signal lead pins and the rest of power supply pins are collectively sealed in the other side of pre-amplifier 66. While, for the transmitter unit, the second group of lead pins 52$b$ includes two pins for supplying the switching current and the one pin for outputting the monitored signal from the MPD 68. The second group 52$b$ of lead pins is collectively sealed in the second region 50$e$. Thus, the arrangement of three groups, 52$a$ to 52$c$, of the lead pins may effectively isolate the receiving signal from the transmitting signal.

(Optical Receptacle)

Figure 6A:
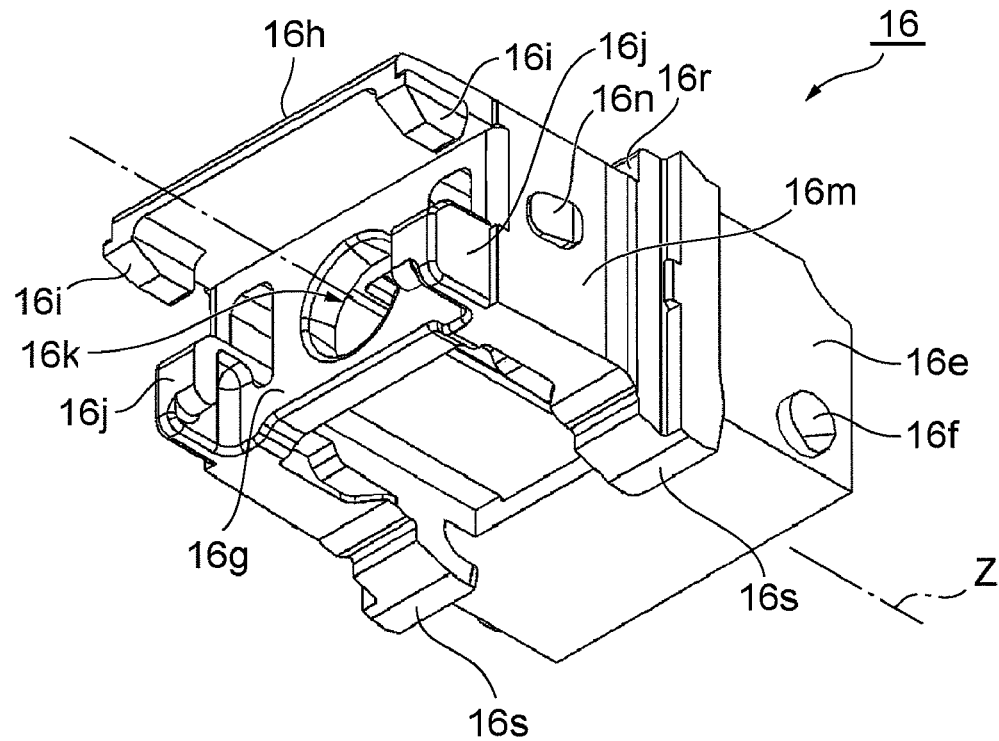
FIGS. 6A and 6B are perspective views of the optical receptacle, where
Figure 6B:
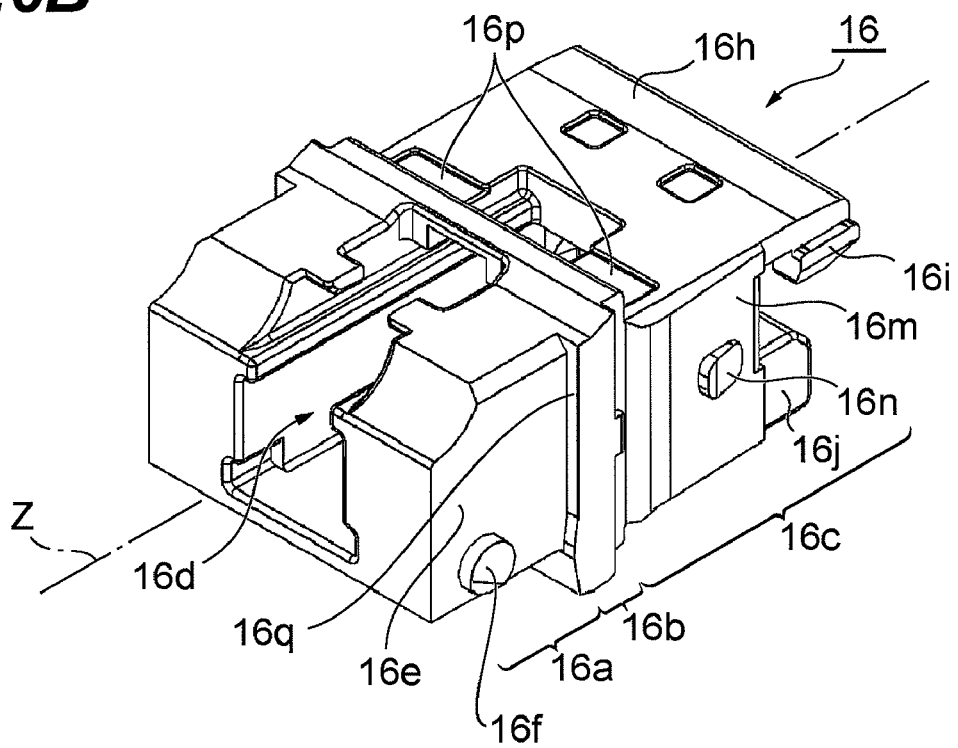

FIGS. 6A and 6B are perspective views of the optical receptacle 16. FIG. 6A looks the optical receptacle 16 from the rear bottom, while, FIG. 6B looks it from the front top. The optical receptacle 16 is made of resin. Although the present optical receptacle 16 is electrically insulating, the electrically conductive optical receptacle may be applicable by coating a metal on the surface thereof, or by using conductive resin.

The optical receptacle 16 includes a front portion 16$a$, an intermediate portion 16$b$, and a rear portion 16$c$. The front portion 16$a$ provides a space 16$d$ in a center of the front end, which receives the optical connector. Here, the optical receptacle shown in FIGS. 6A and 6B assumes the LC-type connector. Each of side walls 16$e$ of the front portion 16$a$ forms a pivot 16$f$, around which the bail 12 rotates so as to traverse the space 16$d$.

The rear portion 16$c$ provides various structures to assemble the optical module 18 therewith. First, the rear portion 16$c$ extends the ceiling 16$h$ rearward from the rear wall 16$g$ to form hooks 16$i$ in both sides of the ceiling 16$h$. This hook 16$i$ engages with the opening 22$f$ of the side wall 22$e$ of the base 22 when the base 22 is set with the optical receptacle 16. The rear wall 16$g$ also forms hooks 16$j$ in lower both sides thereof. The hook 16$j$ extends rearward from the wall 16$g$ and downward so as to face the rear wall 16$g$. Inner part of this hook 16$j$ receives the corner 22$d$ of the front wall 22$a$ of the base 22.

Moreover, formed in a center of the rear wall 16$g$ is an opening 16$k$ connecting with the space 16$d$ in the first portion 16$a$. The coupling portion 32 of the optical module 18 is inserted therein. This opening 16$k$ is formed in flat in four edges thereof. Intervals between edges facing each other are set to be slightly smaller than the outer diameter of the first sleeve; accordingly, inserting the tip of the first sleeve 36 into this opening 16$k$, the optical receptacle 16 may rigidly fix the optical device 18 along the longitudinal axis Z.

Figure 7:
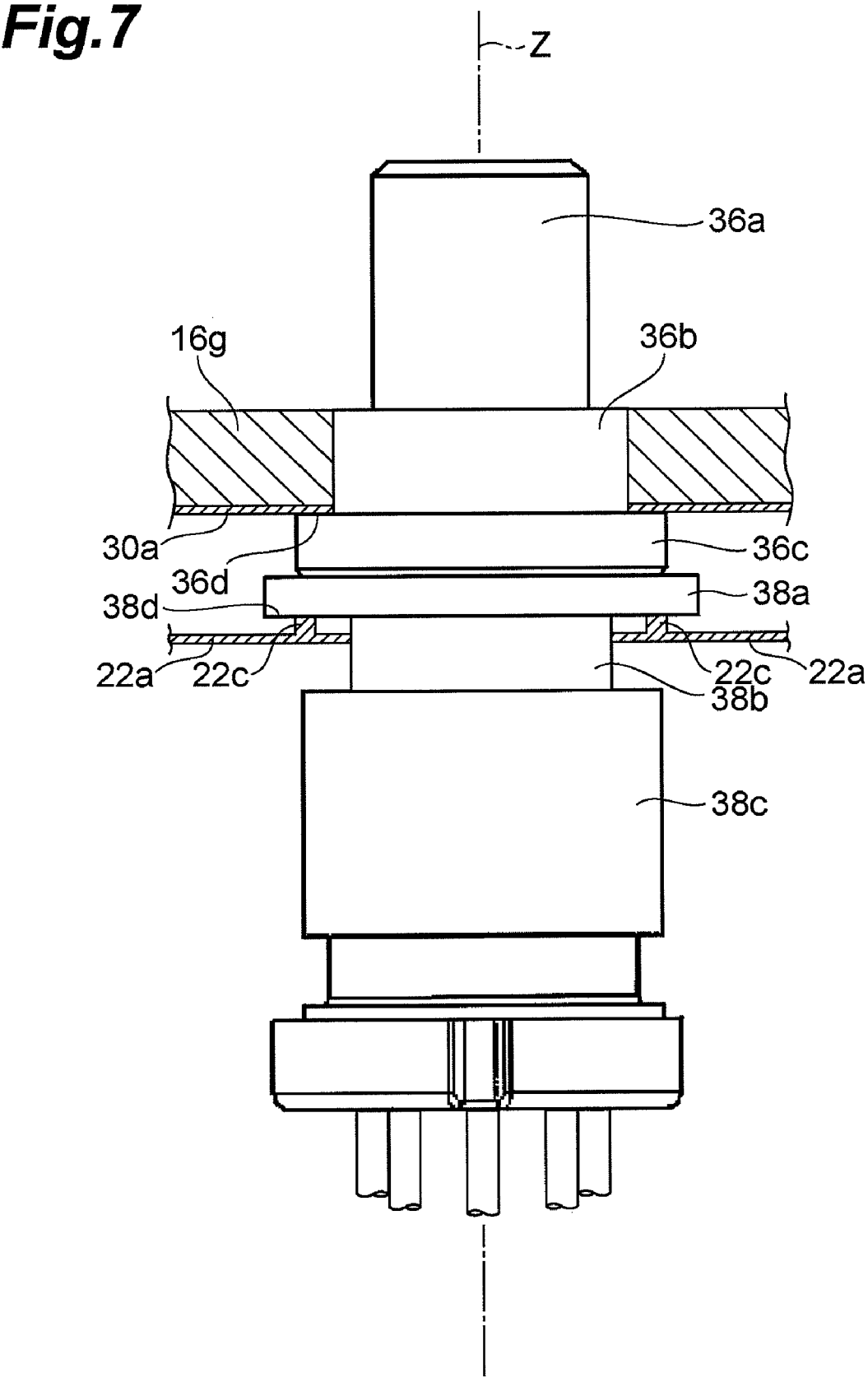
FIG. 7 is a longitudinally cross section of the optical module, the optical receptacle, the base and the finger member assembled with each other, which is taken along the ling VII-VII shown in FIG. 2.

The diameter of the opening 16$k$ is smaller than that of the flange 36$c$. Inserting the sleeve portion 36 into the opening 16$k$, as illustrated in FIG. 7, the front surface 36$d$ of the flange 36$c$ faces and abuts against the rear wall 16$g$. Assembling the base 22 with the optical receptacle 16 and the cover 28 also with the optical receptacle 16, the base 22 in the front wall 22$a$ thereof presses the rear surface 38$d$ of the J-sleeve 38 frontward, and receives the repulsive force from the receptacle 16. However, the hooks, 16$i$ and 16$j$, in the rear wall 16$g$ receive this repulsive force to secure the abutting force against the optical receptacle 16. The optical module 18 is thus aligned with the optical receptacle 16. As described below, the finger member 30 is put between the front surface 36$d$ of the flange 36$c$ and the rear wall 16$g$. The finger member 30 electrically couples the J-sleeve 38 with the cover 28 and the inner surface of the cage, thus, the J-sleeve 38 is electrically connected to the chassis ground.

Referring to FIGS. 6A and 6B, again, the rear portion 16$c$ provides a pair of side walls 16$m$ each having a projection 16$n$ to hook the cover 28 and the finger member 30. This projection 16$n$ doubly fits with the opening 30$i$ of the finger member 30 and the opening 28$a$ in the side of the cover 28 to assemble the cover 28 with the optical receptacle 16. The front end of the rear ceiling 16$h$ provides two hollows 16$p$ to receive the finger member 30 therein such that, when the transceiver 10 is set in the cage and the finger member 30 is pressed inward, the finger member 30 is sheltered within the hollows 16$p$ so as not to be deformed.

The intermediate portion 16$b$ has a peripheral larger than that of the front portion 16$a$ and that of the rear portion 16$c$ so as to form a steps, 16$q$ and 16$r$, in the boundary with the front portion 16$a$ and with the rear portion 16$c$, respectively. The former step 16$q$ operates as a stopper for the rotation of the bail 12. The tip of the finger member 30 abuts against the rear step 16$r$ when the finger member 30 comes in contact with the cage, which always induces the outward force in the finger member 30 so as to come in stably contact with the cage.

Provided on the bottom of the intermediate portion 16$b$ is pockets 16$s$ in both sides thereof, which operates the axis of the seesaw motion of the actuator 14. The rotation of the bail 12 around the pivot 16f synchronously induces the seesaw motion of the actuator 14. The projection provided in the rear end of the actuator 14 is pulled inward by this seesaw motion to disengage the actuator 14 with the cage, which enables the transceiver 10 to be extracted from the cage.

(Finger Member)

Figure 8:
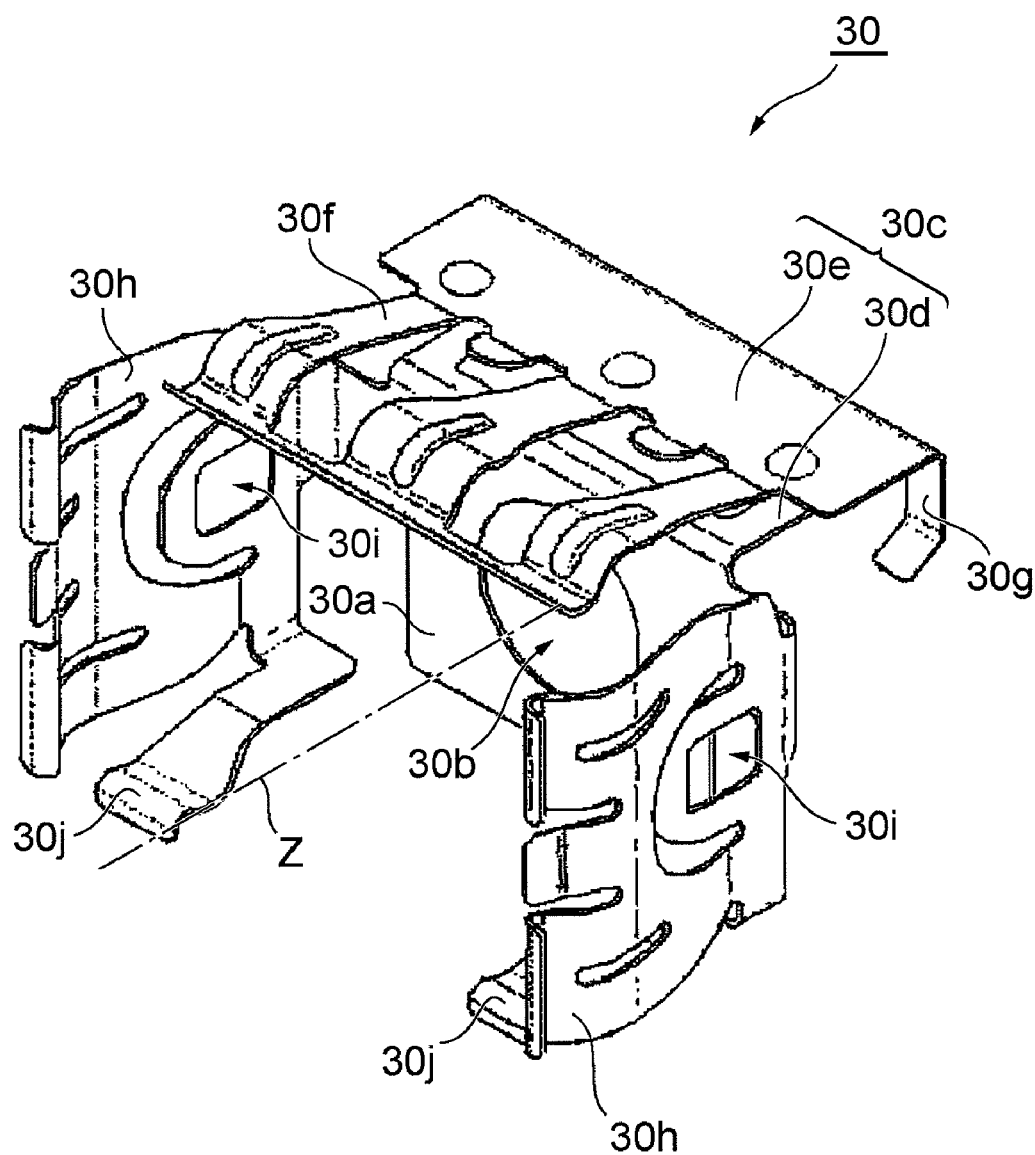
FIG. 8 is a perspective view of the finger member.

FIG. 8 is a perspective view of the finger member 30. The finger member 30 is also formed by cutting and bending a metal sheet without any adhesive or welding. The center piece 30a with a substantially rectangular shape provides an opening 30b into which the first sleeve 36 of the optical module 18 is inserted when the optical module 18 is assembled with the optical receptacle 16 as illustrated in FIG. 7.

The center piece 30a joins the rear piece 30c with the U-shaped cross section so as to trace the ceiling 16h of the optical receptacle 16. That is, the rear piece 30c includes the upper fragment 30e tracing the upper surface of the ceiling 16h and the lower fragment 30d tracing the lower surface of the ceiling 16h. The tip of the upper fragment 30e protrudes a plurality of top fingers 30f, tips of which are connected to each other and abuts against the step 16r of the optical receptacle 16. The top finger 30f is bent outward in a middle portion thereof. The hollow 16p provided in the top of the optical receptacle 16 receives these finger members 30f when the bent portion is pressed inward by the cage at the insertion of the transceiver 10 into the cage. The hooks 30g in both sides of the upper fragment 30e trace the hooks 16i of the optical receptacle 16.

The center piece 30a extends the side pieces 30h in both side edges thereof forwardly. This side piece 30h is also bent outwardly in a center thereof and provides an opening 30i hooked with the projection 16n of the optical receptacle 16. The bottom fragment 30j extends frontward from the bottom edge of the side piece 30h. This bottom piece 30j is also bent outwardly in a center thereof. Thus, the pieces, 30f, 30h and 30j, are formed so as to surround the optical receptacle 16, and reliably come in contact with the inner wall of the cage at the respective bent portion when the transceiver 10 is set within the cage of the host system. Moreover, this reliable contact of the finger member 30 with cage performs not only to stabilize the ground potential but to conduct heat effectively from the optical module 10 to the cage through the heat conductor 26 and the cover.

(Base)

Figure 9A:
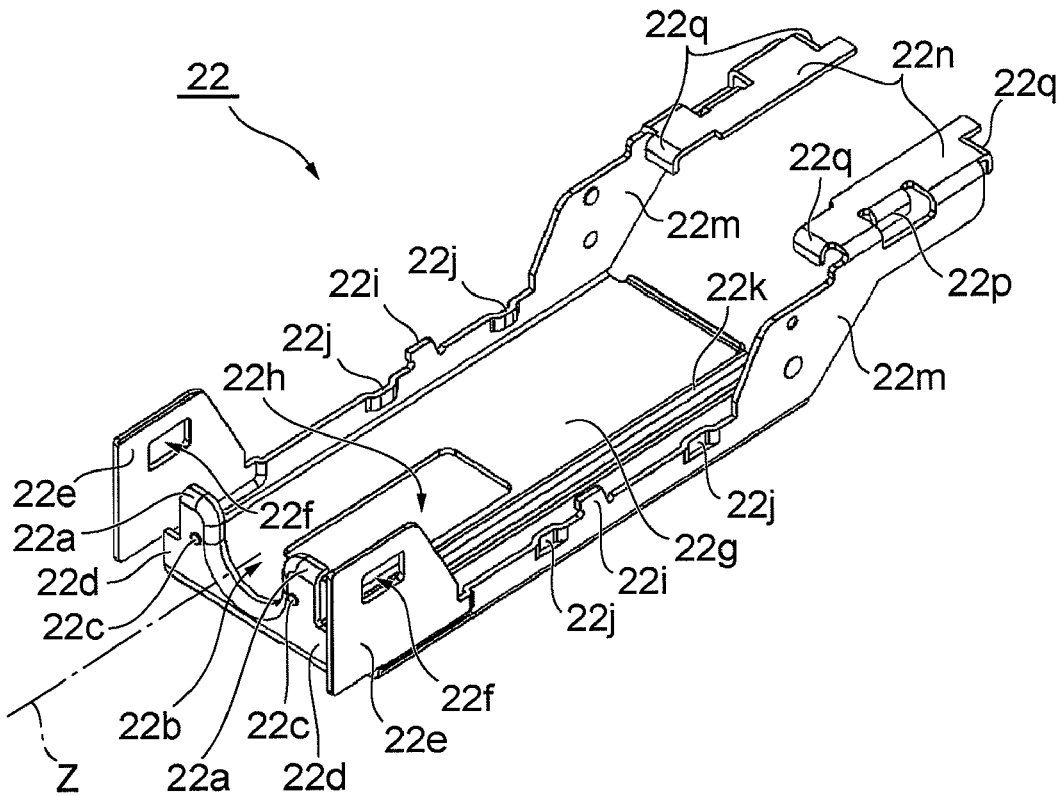
Figure 9B:
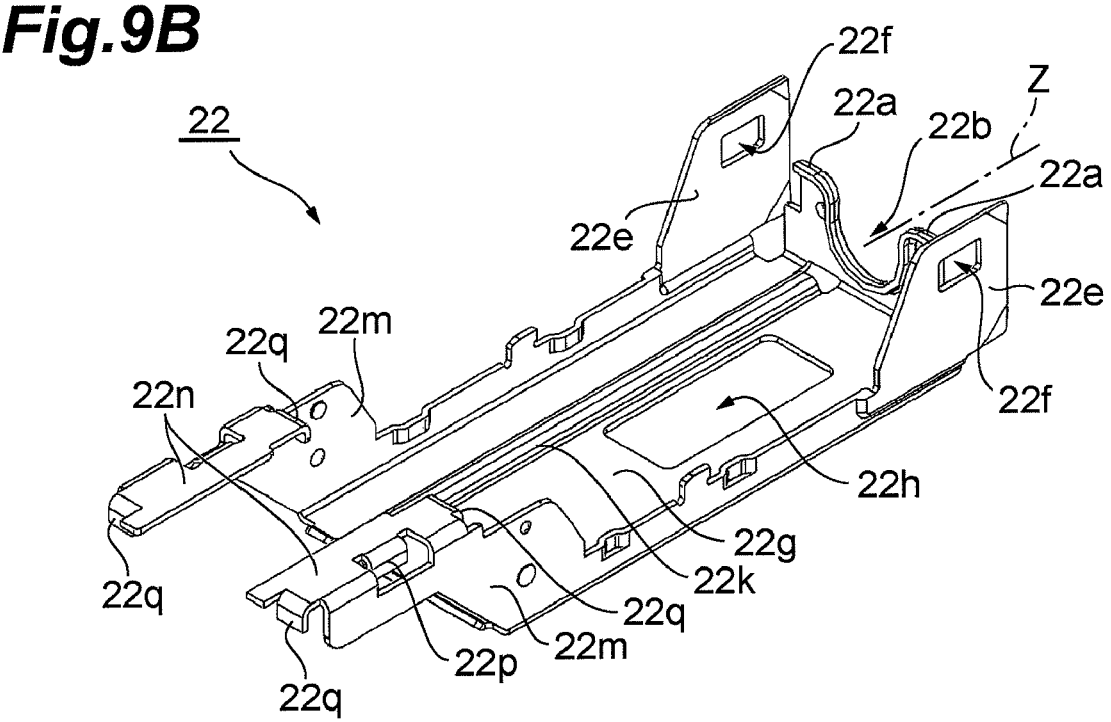

FIGS. 9A and 9B are perspective views of the base 22, where FIG. 9A is viewed from the frontward, while, FIG. 9B is viewed from the rear of the transceiver 10. This base 22 is also formed by cutting and bending a metal sheet without any adhesive or welding.

The base 22 provides the front wall 22a intersecting the longitudinal axis Z in substantially perpendicular. The front wall 22a provides a cut 22b with a semi-circular shape where the neck portion 38b of the J-sleeve 38 is set and projections in both side of the cut 22b. Assembling the base 22 with the optical receptacle as the neck portion 38b is set in the cut 22b, the projections 22c abuts against the rear surface 38d of the flange 38a and pushes the optical module 18 to the rear wall 16g of the optical receptacle 16 as the flange 38a sandwiches the center piece 30a of the finger member 30. Only the top of these projections 22c comes in contact with the center piece 30a not the whole surface of the front wall 22a, which may absorb the mechanical tolerance of the base 22 and stabilize the positional accuracy of the optical module 18 and the finger member 30 relative to the optical receptacle.

In a case where the base 22 is formed by, for instance, the milling or the die-casting, the accuracy of the physical dimensions of the front wall 22a may be easily secured. Moreover, such a front wall 22a may have a substantial thickness enough to evenly push the flange 38a against the rear wall 16g. However, when the base is made of metal sheet, as those in the present embodiment, the front wall 22a sometimes has less dimensional accuracy due to the bending, and is inherently unable to press the flange 38a evenly. Two projections 22c prepared in the front wall 22a may absorb the mechanical tolerance and evenly press the flange 38a. The projections 22c in the front wall 22a may be formed in co-axially with respect to the axis Z.

The front wall 22a provides two corners 22d in both sides thereof. This corner 22d, as already described, is set between the hook 16j and the rear wall 16g. Moreover, the base 22 provides, in a front portion thereof, side walls 22e each having an opening 22f to be mated with the hook 16i to assemble the base 22 with the optical receptacle 16. That is, the corner 22d engages with the hook 16j in the lower side of the optical receptacle 16, while, the opening 22f engages with the hook 16i in the upper side, which completes the assembly of the base 22 with the receptacle 16.

Provided in the bottom 22g of the base 22 is a large opening 22h. As described later, this opening 22h enables the soldering of the lead pins of the optical module 18 with conductive patterns in the bottom surface of the PCB 20. Side walls rising from the bottom 22g provide a plurality of steps 22j and projections 22i, while, the sides of the PCB 20 forms the cut mated with these projections 22i. The steps 22j may stably set the PCB 20 thereon by increasing the seated area for the PCB 20. The rib 22k in the bottom 22g is offset from the center of the bottom 22g so as to escape the opening 22h. This rib 22k may strengthen the base 22 along the longitudinal axis Z. This rib 22k mates with the bottom of the cover 28 to prevent the cover 28 from being deformed. Provided in the rear end of the base 22 are the rear side walls 22m and the mechanisms, 22n, 22p and 22q, to mate the base 22 with the sub-base 24.

Figure 10:
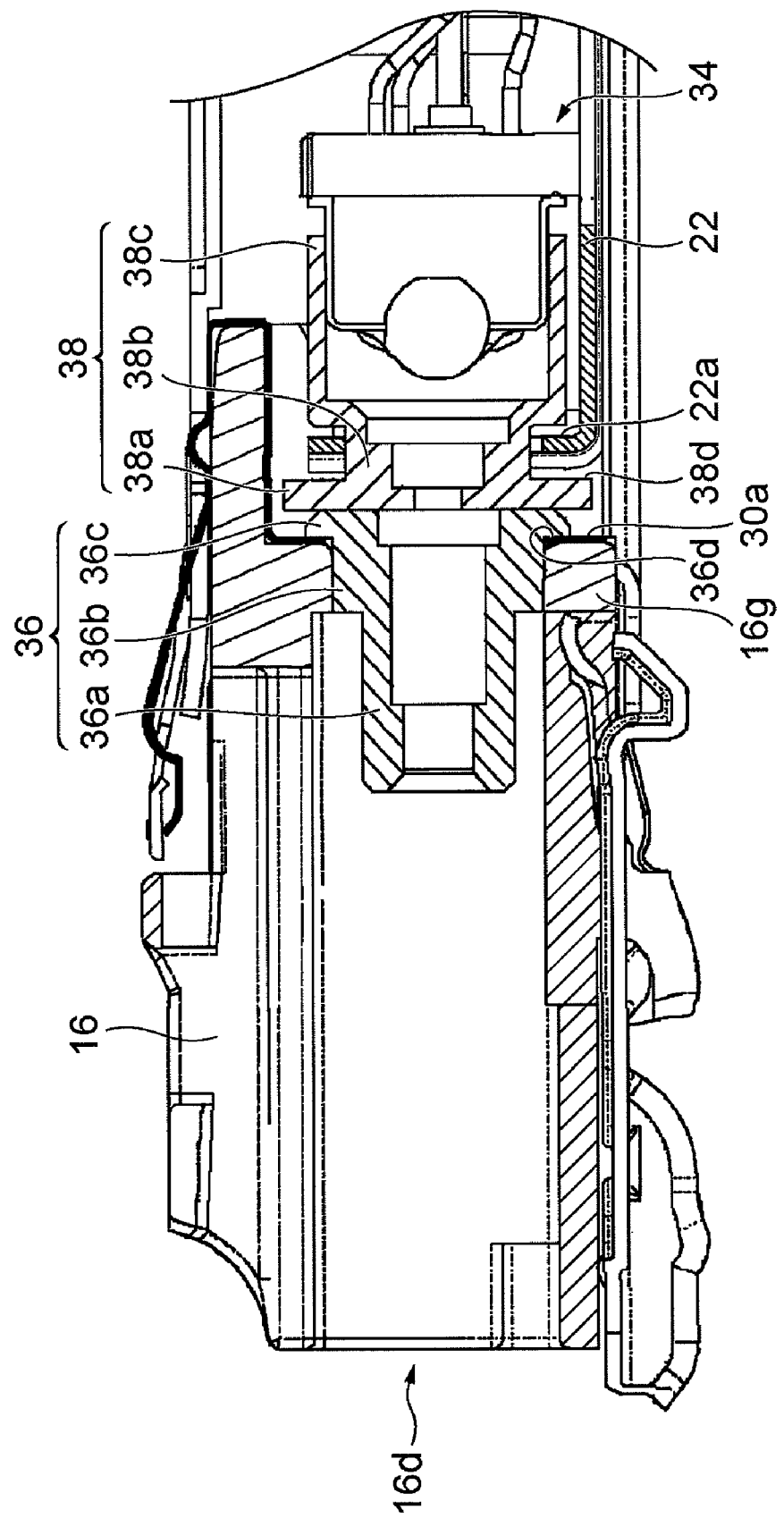
FIG. 10 is a longitudinal side cross section of the optical module, the optical receptacle, the base and the finger member, which is taken along the line X-X shown in FIG. 1.

FIG. 10 is a cross section of the optical receptacle 16, the optical module 18, the finger member 30 and the base 22 assembled to each other. FIG. 10 is taken along the line X-X in FIG. 1. As illustrated in FIG. 10, the front surface 36d of the flange 36c abuts against the rear wall 16g as it sandwiches the center piece 30a of the finger member 30 with the rear wall 16g. The finger member 30 exposes the top piece 30f from the boundary between the optical receptacle 16 and the cover 30 as it traces the ceiling 16h of the receptacle 16 by the upper and lower pieces, 30e and 30d.

The base 22 in the front wall 22a thereof sets the neck portion 38b of the J-sleeve 38. Although FIG. 10 does not explicitly illustrates a condition where the projection 22c in the front wall 22a abuts against the rear surface 38d of the flange 38a, which pushes the first sleeve 36 into the opening 16k of the optical receptacle 16. Formed between the front wall 22a and the rear surface 38d is a gap as shown in FIG. 10, whose width is substantially equal to the height of the projection 22c, or is slightly smaller than the height when the tip of the projection 22c is crashed.

The top finger 30f, as shown in FIG. 10, protrudes from the body of the transceiver 10 and comes in contact with the inner wall of the cage, while, the center piece 30e is put between the rear wall 16g and the flange 36c, thus, the coupling portion 32 and the optical receptacle 16 is stably connected to the chassis ground through the finger member 30. Moreover, the present embodiment provides the electrically conductive J-sleeve 38; accordingly, the chassis ground may be conducted to the base 22. On the other hand, the package of the optical device 34 should be conducted to the signal ground from the viewpoint of the EMI tolerance and the crosstalk performance. When the J-sleeve 38 is electrically connected with the package of the optical device 34, the chassis ground in the J-sleeve 38 and the signal ground in the optical device 34 would be intermingled. Thus, the J-sleeve 38 should be electrically isolated from the package 50 of the optical device 34 by using the insulating adhesive for fixing the J-sleeve 38 with the optical device 34.

Figure 11A:
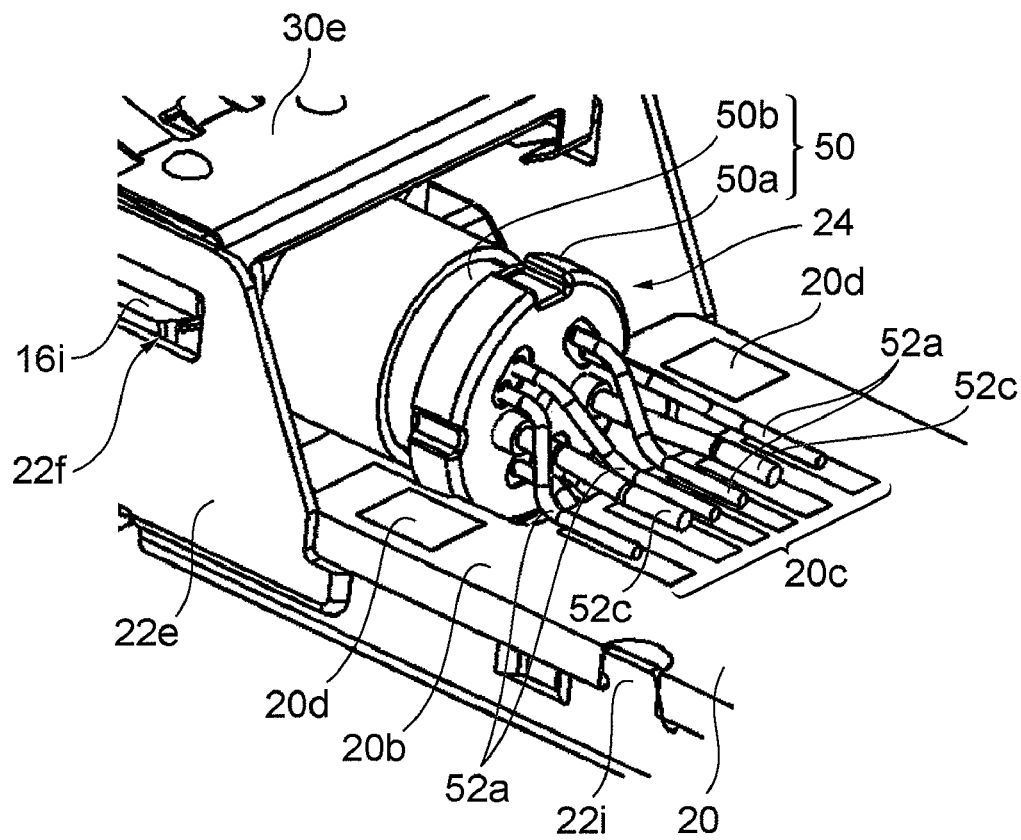
FIG. 11A is a perspective view showing an electrical connection between the optical module and the PCB.
Figure 11B:
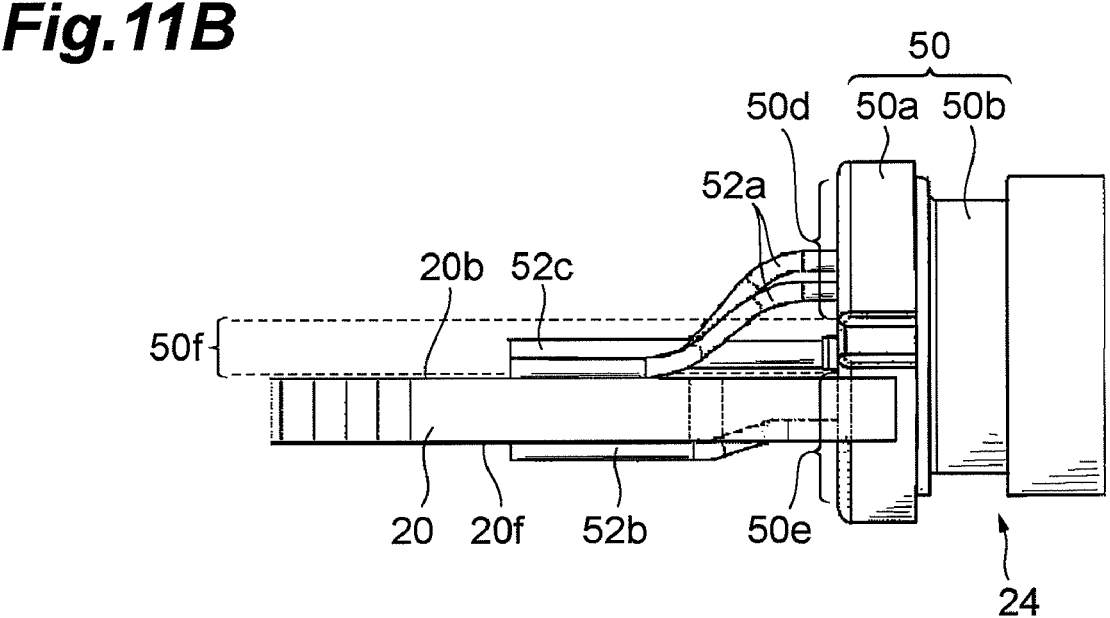
FIG. 11B is a side view of the electrical connection.

FIG. 11A illustrates the arrangement of the electrical connection between the optical receptacle 16 and the PCB 20. FIG. 11A illustrates the optical receptacle 16, the optical module 18 and the PCB electrically assembled with each other and viewed from the rear top. While FIG. 11B is a side view of the optical module 18 and the PCB 20, where the lead pins 52 are extended from the optical device 18 and attached with the conductive pads on the PCB 20. As already explained, the lead pins 52 are divided into three groups, the first one 52a are for the receiver unit in the first region 50d, the second one 52b are for the transmitter unit in the second region 50e, and third on 52c are set between these two groups, 52a and 52b, to provide with the ground lead for the receiver unit with a comparatively larger diameter.

As shown in FIG. 11B, the first region 50d corresponds to the top surface 20b of the PCB 20, while, the second region 50e corresponds to the back surface 20f of the PCB 20. The ground lead 52c is conducted to the ground pad 20d in the back surface 20f as it keeps the substantially straight shape. The lead pins 52a in the first group for the receiver unit are bent to the top surface 20b from the first region 50d, while the lead pins 52b in the second group is bent to the back surface 20f from the second region 50e. The level of the PCB 20, as shown in FIG. 11B, is offset to the second region 50e. Accordingly, the lead pins 52a in the first group are widely bent compared to the lead pins 52b in the second group. Because the lead pins 52b in second group for the transmitter unit flows a large switching current easily to cause a noise source. The arrangement of the lead pins 52 and the level of the PCB 20, where the lead pins 52b for the transmitter unit can be connected to the PCB 20 by lesser bending, may enhance the noise tolerance. Moreover, the ground leads 52c that secures the signal ground for the receiver unit can be straightly connected to the top surface 20b of the PCB 20, which may stabilize the signal ground.

There are various arrangements to distinguish the lead pins 52a of the receiver unit from those 52b of the transmitter unit. FIGS. from 12A to 12C show exemplarily arrangements of the lead pins 52. FIG. 12A shows an arrangement where respective lead pins are independently sealed from the stem 50a, and provided between the receiver and transmitter units are two ground leads 52c. FIG. 12B shows another arrangement where the lead pins of the receiver unit has the same configuration with those of the embodiment described above, while, the lead pins 52b of the transmitter unit follows the arrangement of FIG. 12A and are independently sealed. FIG. 12C corresponds to an arrangement where the lead pins 52a of the receiver unit follow the arrangement shown in FIG. 12B, while the three lead pins 52b of the transmitter unit are collectively sealed. In the arrangement shown in FIG. 12C, the ground leads 52c put between the tow units increase their numbers, specifically, four ground leads 52c are put between two units, which may enhance the electrical isolation between two units.

Figure 13:
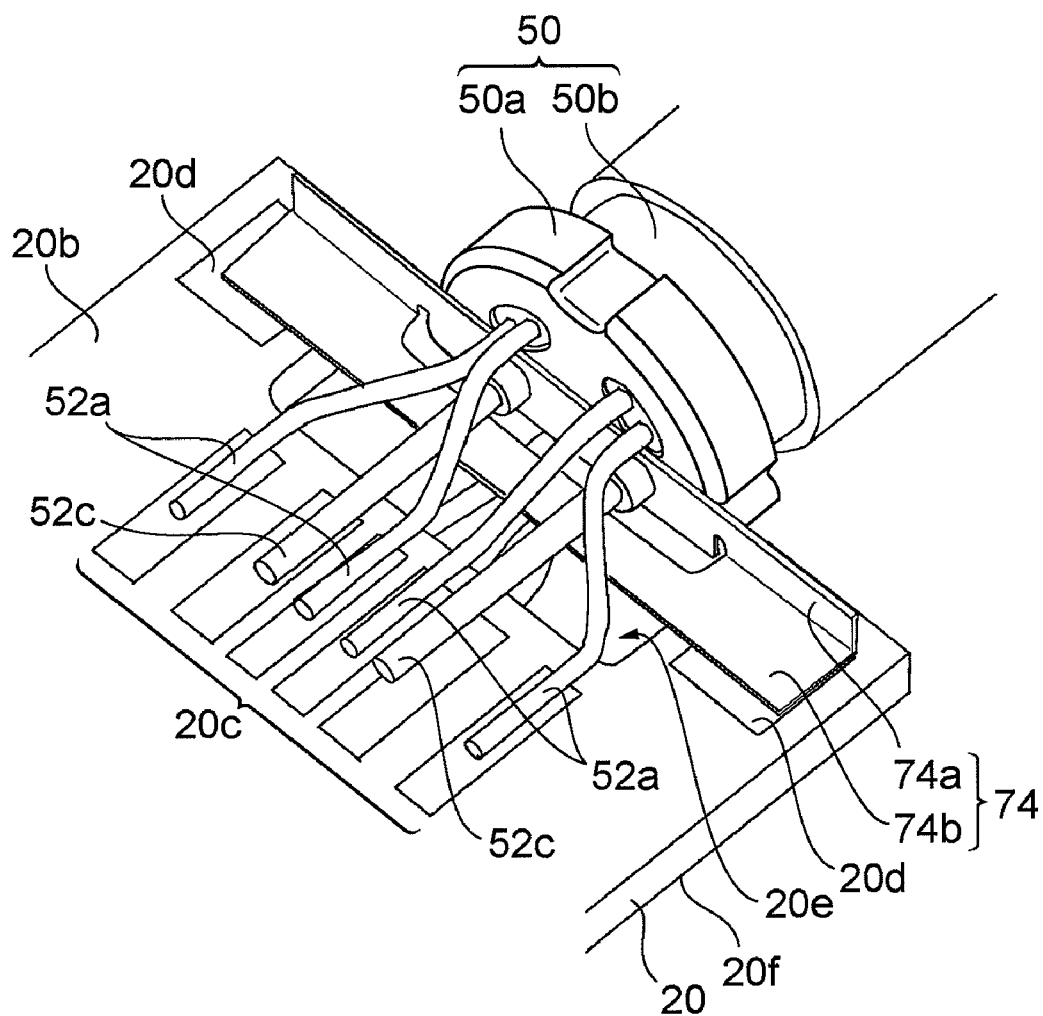
FIG. 13 is a perspective view showing the arrangement of the lead pins of the optical device, in which the first group of the lead pins and the second group of them are isolated by the ground plate.

FIG. 13 illustrates still another arrangement to isolate two units efficiently. In this arrangement, the lead pins 52a and 52b in the first and second groups follow the arrangement mentioned above, such as those shown in FIG. 12C, while, the third lead pins 52c provides a ground plate 74. The PCB 20 provides, in a front end thereof, a cut 20e surrounded by the side extensions to arrange the lead pins 52a to 52c therein. Provided on the side extensions 20a are the ground pads 20d. The ground plate 74, which is formed by bending the metal sheet, has the plane portion 74a and the stand portion 74b. The stand portion 74b, which extends along the third region 50f of the stem 50a, receives the root of the ground leads 52c. The plane portion 74a extends along the top surface 20b of the PCB 20 and comes in electrically contact with the ground pads 20d. In this arrangement, the electrical isolation between two units may be further enhanced because the former embodiments use only the ground lead 52c extending along in one dimension, while, the arrangement shown FIG. 13 provides two-dimensional ground plate 74 between two units.

(Sub-base and Heat Conductor)

Figure 14:
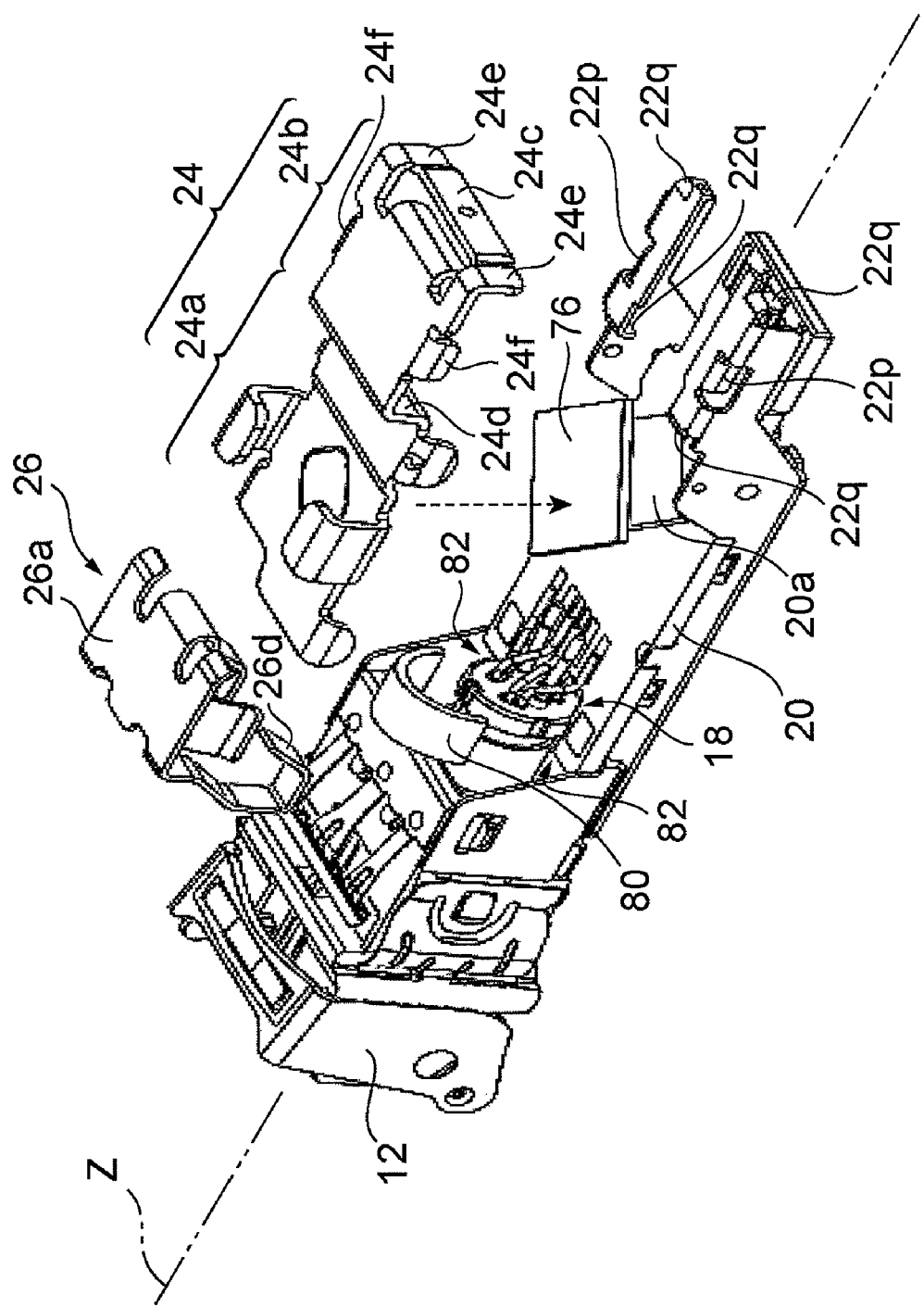
FIG. 14 shows a process to assemble the sub-base and the heat conductor with the base and the optical module.

FIG. 14 shows a process to assemble the sub-base 24 and the heat conductor 26 with the unit including the optical receptacle 16, the optical module 18, the PCB 20 and the base 22. The sub-base 24 is a member for securing the PCB 20 by putting it with the base 22. The sub-base is also formed by cutting and bending a metal sheet without any adhesive or welding.

The sub-base 24 includes first and second portion, 24a and 24b, from the front to rear sides. The first portion 24a comes in thermally contact with the ICs 20a through the heat spreader 76 that may be made of resin, specifically, a silicone rubber. The second portion 24b provides the heat conducting surface 24c in the rear end thereof and the mechanism to be assembled with the base 22, which will be described in detail below.

The base 22 provides, as shown in FIGS. 9A and 9B, a pair of rear side walls 22m each rising from the sides and extending rearward. Upper end of the side wall 22m is bent inward to provide a flat top 22n that extends in substantially parallel with the bottom 22g. The front end and the rear end of the flat top 22n are bent downward to form a pair of flaps 22q facing to each other in the longitudinal direction Z, and another pair of flaps 22p in the lateral direction. The sub-base 24 forms a step 24d between two portions, 24a and 24b. The rear end of the second portion 24b is bent downward and forms two surfaces 24e, which faces the step 24d along the longitudinal direction Z and put the heat conducting surface 24c between the end surfaces 24e. This heat conducting surface 24c protrudes from the end surfaces 24e. The second portion 24b further provides other flaps 24f in both sides thereof along the longitudinal axis Z. This flaps 24f put the flaps 22p in the base 22, while, the step 24d and the rear end surface 24e put the flaps 22q in the base, respectively; thus, the sub-base 24 may be assembled with the base 22 only by the fitting without any screw not adhesive.

Figure 15A:
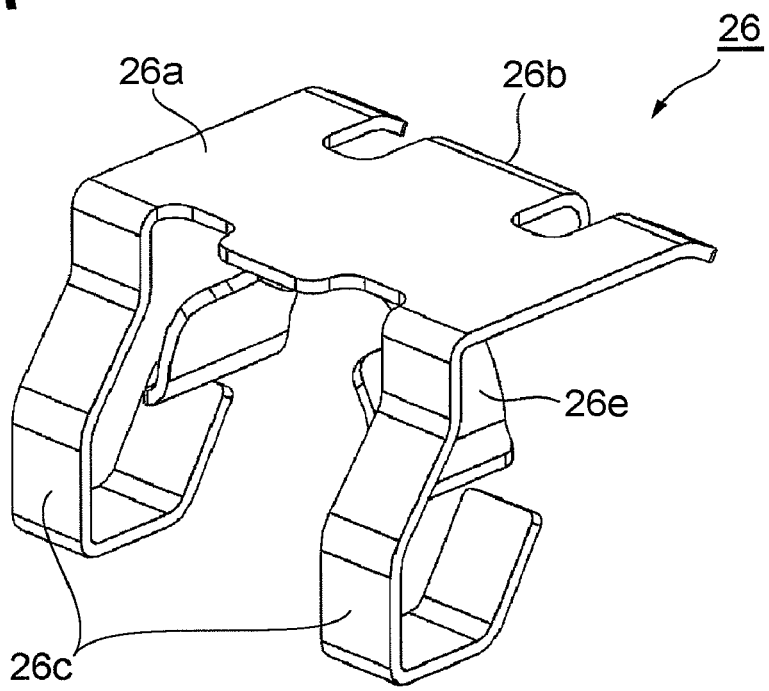
FIGS. 15A and 15B are perspective views of the heat conductor according to an embodiment of the present invention.
Figure 15B:
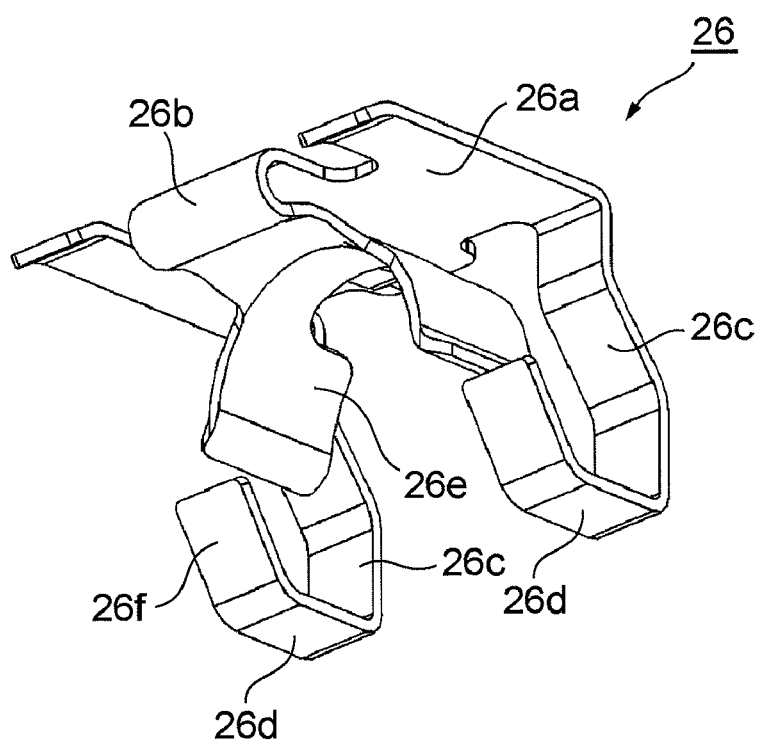

The heat conductor 26 is also formed by cutting and bending a metal sheet without any adhesive or welding. As shown in FIGS. 15A and 15B, the heat conductor 26 provides a ceiling piece 26a, a tracing piece 26e, and a pair of legs 26b. The ceiling piece 26a comes in contact with the inner surface of the cover 28 when the cover is fit with the assembly of the base 22, the sub-base 24, and the heat conductor 26. The end 26b of the ceiling piece 26a is bent twice so as to form the U-shape. The front end of the ceiling piece 26a protrudes the front legs 26c. The legs 26c are bent several times to form the J-shape with a flat bottom surface 26d. The end 26b continues with the tracing pieces 26e that collectively form a semi-circular cross section so as to trace the upper half of the optical device 34.

As shown in FIG. 14, the tracing pieces 26e come in contact with the optical device 34 through the heat spreader 80, which also has the semi-circular shape. The legs 26c are inserted into a room 82 formed between the optical receptacle 16 and the PCB 20 in both sides of the optical module 18 so as to come the bottom surface 26d thereof in directly contact with the bottom 22g of the base 22. In this arrangement, the bent end 26f of the leg 26c is in contact with the front edge of the PCB 20 and the front end of the leg 26c comes in contact with the rear wall 16g of the receptacle 16 with interposing the finger member 30 therebetween. Because the elastic characteristic of the bent end 26f, the heat conductor 26 is not slip out after it is once set in the preset position.

The present optical device 34 that installs both the LD and the PD, and additionally, the pre-amplifier in the single package generates much heat compared with the device that installs only one of the LD and the PD. Accordingly, the further consideration for the heat dissipating efficiency is necessary compared to such a conventional module. The heat conductor 26 may secure the heat conducting paths from the optical device 34 to the cover 28 and also to the base 22. Specifically, the ceiling piece 26a comes in contact with the cover 28, while, the bottom surfaces 26d of the leg 26c comes in directly contact with the base 22. Still further, this heat conductor 26 is mechanically independent of the sub-base 24, namely, apart from the heat first conducting path formed by the sub-base 24, that conducts heat generated by the ICs 20a on the PCB 20; accordingly, the optical device 34 may be escaped from the heat generated by the ICs 20a.

Figure 16:
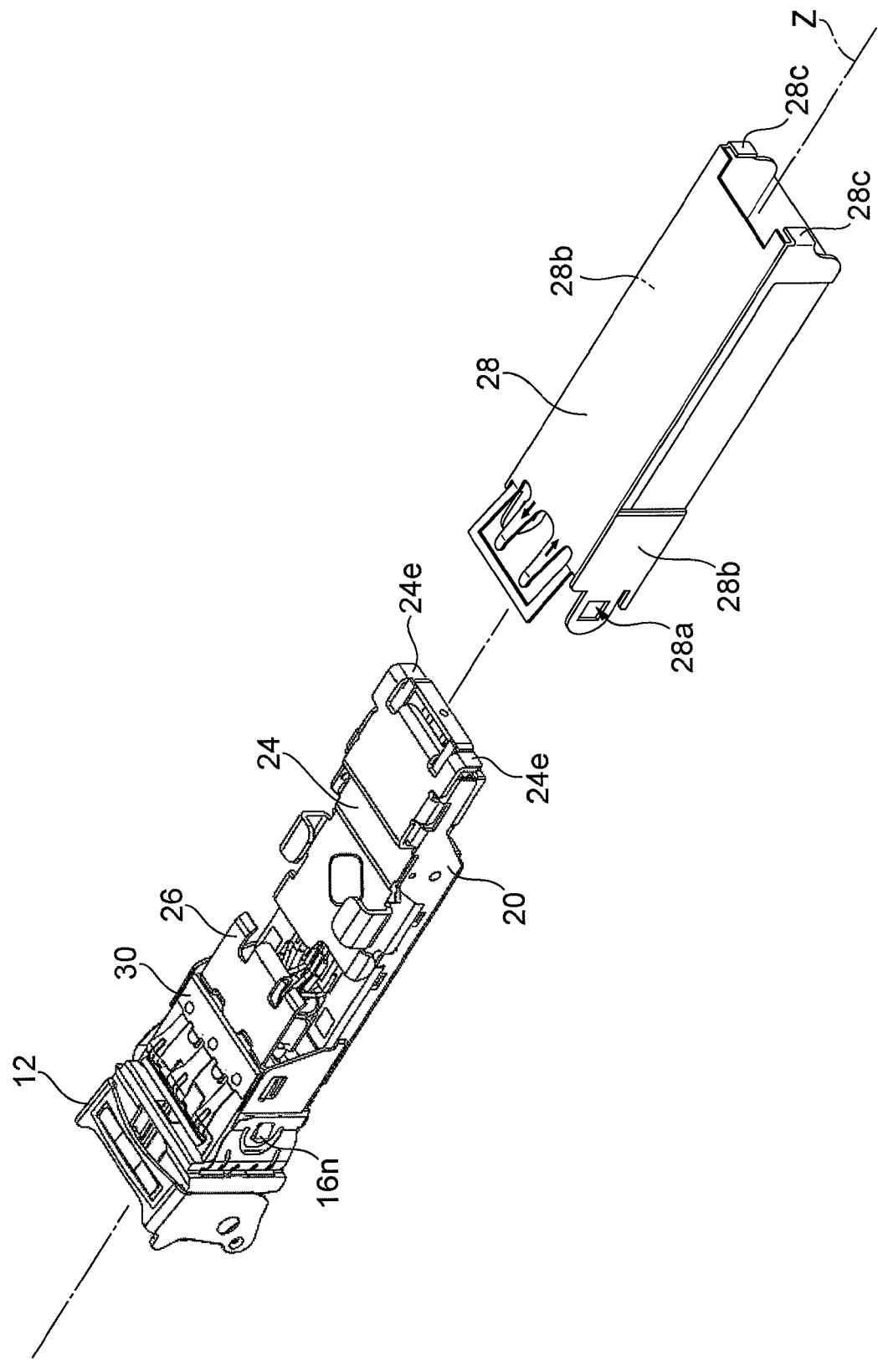
FIG. 16 shows a process to assemble the cover with the base, the sub-base, and the optical receptacle.

FIG. 16 illustrates a perspective view of the transceiver 10 after the completion of the assembly of the optical receptacle 16 with the bail 12, the optical module 18, the finger member 30, the heat conductor 26, the PCB 20, the base 22 and the sub-base 24 but without the cover 28. The cover 28 includes a side wall 28b provided with an opening 28a and a bent flap 28c in the rear end thereof. This bent flap 28c faces the end surface 24e of the sub-base 24. Assembling the cover with the optical receptacle 16, the projection 16n in the side wall of the optical receptacle engages with the opening 28a. A distance from the opening 28a to the bent end 28c is set slightly shorter than a distance from the projection 16n to the end surface 24e. Thus, engaging the projection 16n with the opening 28a, the bent end 28c comes in contact with the end surface 24e of the sub-base, which induces the force to press the coupling portion 32 of the optical module 18 forward into the opening 16k by the projection 22c of the base 22.

As shown in FIG. 16, the present optical transceiver 10 thus assembled as described above effectively arranges respective members within a space formed by the cover 28, and shows a preferable noise tolerance, a crosstalk performance, and a heat dissipating function.

The foregoing is illustrative of the present invention, and is not to be construed as limiting thereof. The invention is defined by the following claims, with equivalents of the claims to be included therein.

What is claimed is:

1. An optical transceiver installed on and communicated with a host system by being inserted in a cage prepared in said host system, comprising:

a bi-directional optical sub-assembly with a single package that installs a light-emitting device and a light-receiving device within said single package;

a printed circuit board configured to mount an IC that is electrically connected with said bi-directional optical sub-assembly;

a base made of a metal sheet for mounting said printed circuit board and said bi-directional optical sub-assembly thereon;

a sub-base made of a metal sheet for sandwiching said printed circuit board with said base, said sub-base being thermally in contact with said IC on said printed circuit board; and a cover for enclosing said bi-directional optical sub-assembly, said printed circuit board, said base and said sub-base therein; and a heat conductor in thermal contact with said bi-directional optical module, said base and said cover but independent of said sub-base for conducting heat generated in said bi-directional optical sub-assembly to said cover and said base.

2. The optical transceiver according to claim 1, wherein said heat conductor includes a ceiling piece and a leg piece with a bottom surface, said ceiling piece coming in thermal contact with an inner surface of said cover, said bottom surface of said leg piece coming in thermal contact with said base in both sides of said bi-directional optical sub-assembly.

3. The optical transceiver according to claim 1, wherein said single package has a co-axial outer shape, and said heat conductor includes a tracing piece that traces an outer shape of said co-axial outer shape.

4. The optical transceiver according to claim 3, wherein said tracing piece comes in thermal contact with said package through a heat spreader made of resin.

5. The optical transceiver according to claim 1, further comprising a finger member made of a metal sheet thermally coupled with said bi-directional optical sub-assembly, wherein said finger member comes in contact with an inner surface of said cage to dissipate heat from said bi-directional optical sub-assembly to said cage independently of said heat conductor and said sub-base.

6. The optical transceiver according to claim 5, wherein said bi-directional module includes a coupling portion and an optical device with said single package, said finger member being secured in said coupling portion.

7. The optical transceiver according to claim 1, wherein said cover comes in thermal contact with said cage at a rear end thereof.

* * * * *